United States Patent [19]
Farine et al.

[11] Patent Number: 5,736,640
[45] Date of Patent: Apr. 7, 1998

[54] DEVICE AND METHOD FOR MEASURING AN ANGULAR SPEED

[75] Inventors: Pierre-André Farine, Neuchâtel; Jean-Daniel Etienne, Les Geneveys s/Coffrane; Silvio Dalla Piazza, Saint-Imier, all of Switzerland

[73] Assignee: Asulab S.A., Bienne, Switzerland

[21] Appl. No.: 661,322

[22] Filed: Jun. 13, 1996

[30] Foreign Application Priority Data

Jun. 21, 1995 [FR] France .................. 95 07416

[51] Int. Cl.$^6$ .................................. G01P 9/00
[52] U.S. Cl. .................. 73/504.12; 73/504.02; 310/319
[58] Field of Search .................. 73/504.04, 504.16, 73/504.02, 514.27, 214.29, 514.34, 504.12, 504.15; 310/319, 329

[56] References Cited

U.S. PATENT DOCUMENTS

| | | | |
|---|---|---|---|
| 3,258,617 | 6/1966 | Hart | 310/9.8 |
| 4,791,815 | 12/1988 | Yamaguchi et al. | 73/505 |
| 5,131,273 | 7/1992 | Tabata et al. | 73/505 |
| 5,287,745 | 2/1994 | Dalla-Piazza | 73/505 |
| 5,329,816 | 7/1994 | Söderkvist et al. | 73/505 |
| 5,343,749 | 9/1994 | Macy | 73/505 |
| 5,408,876 | 4/1995 | Macy | 73/505 |
| 5,447,066 | 9/1995 | Terada et al. | 73/504.16 |
| 5,481,913 | 1/1996 | Ito et al. | 73/504.16 |
| 5,481,914 | 1/1996 | Ward | 73/504.16 |

FOREIGN PATENT DOCUMENTS

| | | |
|---|---|---|
| 0 494 588 | 7/1992 | European Pat. Off. . |
| 0 503 807 | 9/1992 | European Pat. Off. . |
| 0 515 981 | 12/1992 | European Pat. Off. . |

*Primary Examiner*—Michael Brock
*Assistant Examiner*—Richard A. Moller
*Attorney, Agent, or Firm*—Griffin, Butler, Whisenhunt & Szipl

[57] ABSTRACT

The angular speed measuring device comprises:
- a transducer (1) intended to rotate at said angular speed;
- means (9) for generating a mechanical vibration of said transducer (1) in response to an excitation signal (OSC), this mechanical vibration comprising a parasite component and at least one useful component having an amplitude which is representative of said angular speed, and
- means for producing an electric detection signal (DET) representative of said mechanical vibration and also comprising a parasite component and at least one useful component having an amplitude which is representative of said angular speed.

The device is characterized in that it further comprises processing means (23) for obtaining from said electric detection signal (DET), an analog measurement signal (S") the amplitude of which only depends on said useful component of the electric detection signal (DET), the parasite component of the electric detection signal being eliminated.

11 Claims, 3 Drawing Sheets

DEVICE AND METHOD FOR MEASURING AN ANGULAR SPEED

The present invention concerns an angular speed measuring device comprising:
- a transducer intended to rotate at said angular speed;
- means for generating a mechanical vibration of said transducer in response to an excitation signal, said mechanical vibration comprising a parasite component, and at least one useful component having an amplitude which is representative of said angular speed;
- means for producing an electric detection signal representative of said mechanical vibration and also comprising a parasite component and at least one useful component having an amplitude which is representative of said angular speed.

The invention further concerns a method of processing excitation and detection signals for facilitating the measurement of the useful component of the detection signal.

The invention applies in particular to the determination of the useful component of the electric detection signal provided by a tuning fork gyrometer in response to an excitation signal, due to the Coriolis force acting on the tuning fork.

Tuning fork gyrometers have a tendency of imposing themselves for the determination of the angular speed of a moving object, due to their small dimensions and their low costs. Complex and expensive gyroscopes have been used for a long time, in particular in aeroplanes or missiles, where they are used to follow the orientation of the aeroplane or the missile with respect to a fixed reference.

But, with possibilities of miniaturisation connected to the tuning fork gyroscope, new applications are contemplated, in particular in the field of automobiles, where they may be integrated into anti-skidding devices or devices for equilibrium correction.

An angular speed measuring device using a quartz tuning fork has been described in detail in the patent EP-B-0 515 981, of the same applicant. In a quartz tuning fork gyrometer, the arms of the tuning fork are provided with electrodes for applying an excitation signal, and with electrodes for detecting a detection signal which corresponds to the response of the tuning fork during its rotation around its longitudinal axis.

Certain documents of the state of the art, in particular the document EP 0 494 588, assume that the correct operation of a tuning fork gyrometer depends, on the one hand, on the implementation of the excitation and the detection electrodes on the tuning fork, allowing to minimise the coupling between the excitation signal and the detection signal, and on the other hand, on the quality of the electronic processing means associated to the tuning fork so as to fully exploit the useful component, typically very small, due to the Coriolis force during the movement of the gyrometer.

However, known tuning fork gyrometers are, in the present state of the art, penalised by the difficulty to measure the useful part of the detected signal corresponding to the Coriolis force, this being all the more true when the rotational speed of the gyrometer is low.

The present invention has as its aim to remedy this inconvenience, by proposing an angular speed measuring device based on the use of the Coriolis force allowing to isolate and to determine with a sufficient resolution the useful component of the detection signal provided by the transducer.

Another aim of the invention is to propose an angular speed measuring device of the type described here above having a higher resolution during the measurement of the detected useful signal.

To this effect, the invention has as its object an angular speed measuring device comprising:
- a transducer intended to rotate at said angular speed;
- means for generating a mechanical vibration of said transducer in response to an excitation signal, said mechanical vibration comprising a parasite component, and at least one useful component having an amplitude which is representative of said angular speed,
- means for producing an electric detection signal representative of said mechanical vibration and also comprising a parasite component and at least one useful component having an amplitude which is representative of said angular speed,
- characterized in that the device comprises processing means for obtaining from said electric detection signal, an analog measurement signal the amplitude of which only depend on the useful component of the electric detection signal, the parasite component of the electric detection signal being eliminated, said processing means comprising means for mixing the detection signal and the excitation signal and comprising phase-shifters which are connected to the inputs of said means for mixing, and capable of rendering the analog measurement signal independent of an initial phase-shift between the excitation signal and the detection signal, in such a way that the amplitude of the resulting measurement signal presents a value which is proportional to the angular speed to be measured.

Advantageously, these analog processing means of the signal comprise a low-pass filter, connected at the output of the mixer, and having a cut-off frequency which is chosen to eliminate the components of the mixed signal which have a frequency superior to the frequency of the excitation signal. Furthermore, amplifiers and all-pass filters used as phase-shifters are connected following the mixer, for eliminating the dependency of the measurement signal with respect to the initial phase-shift between the excitation signal and the detection signal, in such a way that the amplitude of the resulting output signal presents a value which is proportional to the angular speed to be measured.

Preferably, the processing means comprise means for respectively mixing the excitation signal and the detection signal with a reference signal, and which are associated to low-pass filter means and to phase-shifting means, in such a way so as to produce an output signal the amplitude of which is a function of the angular speed and of the amplitude of the reference signal, thereby being independent of the parasite component of the detection signal. In such a case, the reference signal is chosen with an amplitude sufficiently large, which is capable of increasing the resolution of the measurement signal of the angular speed.

The objects and features of the invention will be described more in detail hereafter and by way of a non-limitative example with reference to the drawings in which.

Figure 1A:
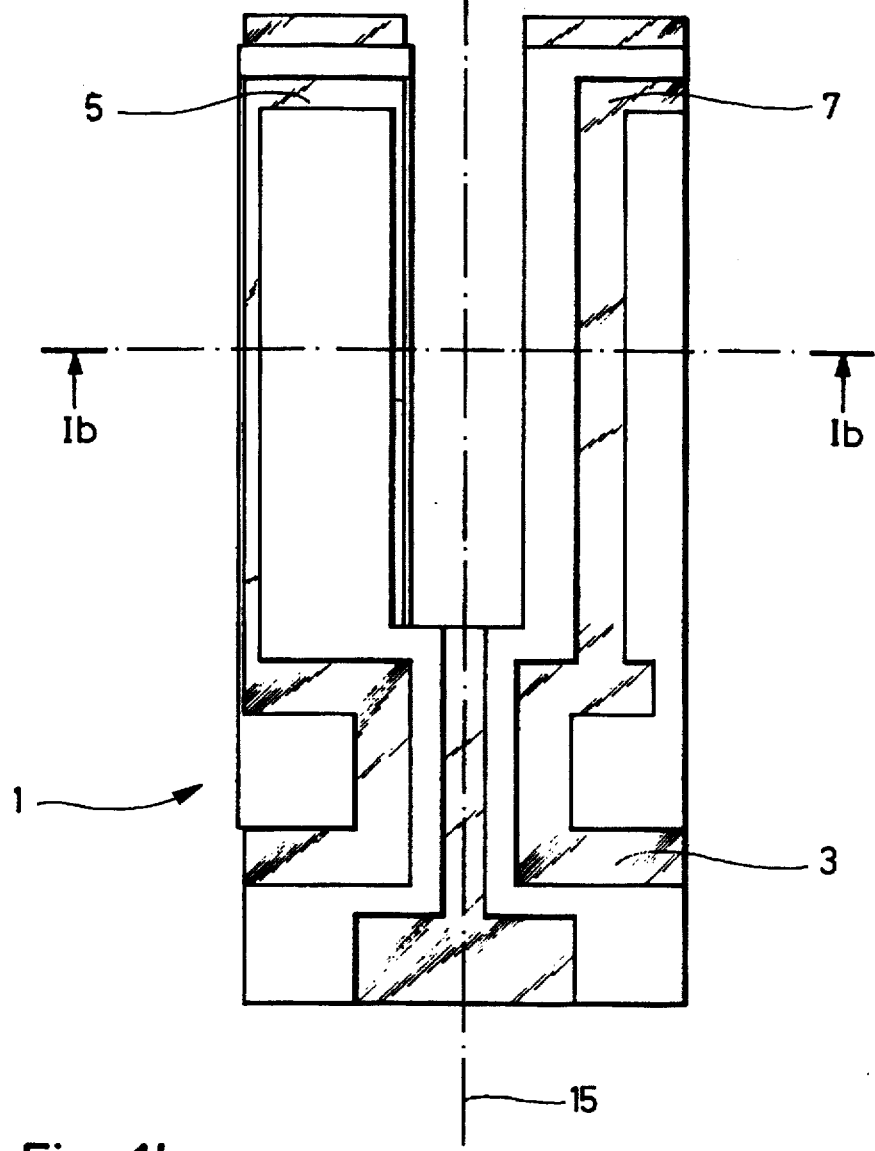
FIG. 1A shows a longitudinal cross-sectional view of a tuning fork such as that used in certain gyrometers.
Figure 1B:
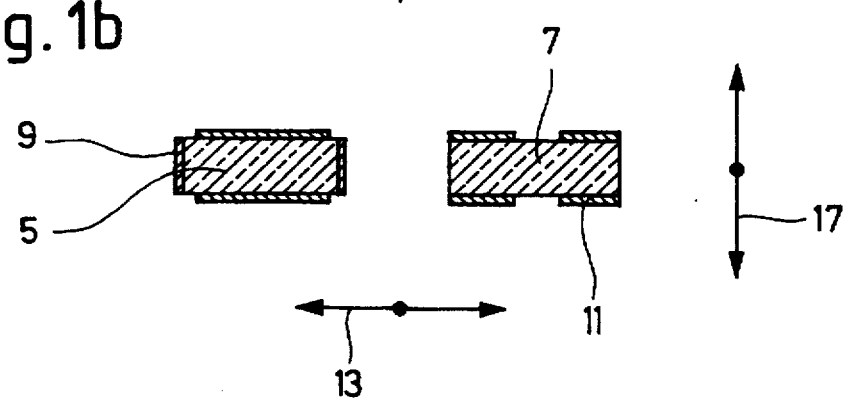
FIG. 1B is a transversal cross-sectional view I—I of the excitation arm (E) and the detection arm (D) of the tuning fork of FIG. 1A.

Reference will now be made to FIG. 1. In this figure an example of a tuning fork 1 of the type used in gyrometers has been represented. Tuning fork 1 is represented in a longitudinal cross-section in FIG. 1A comprising principally a base 3 fixedly connected to two arms 5, 7, the assembly being manufactured of a quartz piezoelectric material. As has been represented by a transversal cross-section view according to FIG. 1B, each arm 5, 7 comprises electrodes 9, 11. The excitation arm (E) 5 comprises excitation electrodes 9, only one of the four electrodes represented having been referenced, allowing the application of an electric signal ±V which allows to excite, and as a consequence allows to mechanically vibrate the arms 5, 7 of tuning fork 1 in a first plane, as indicated by the arrows 13. The detection arm (D) 7 comprises detection electrodes 11, only one of the four electrodes represented having been referenced, which allow to transform the mechanical vibrations of the detection arm into an electric detected signal.

According to the theory of tuning fork gyrometers, an angular rotational movement of tuning fork 1 around its longitudinal axis 15 during which an excitation signal is applied to the excitation electrode (E) 9, generates a Coriolis force perpendicular to the excitation, and as a consequence a vibration of at least the detection arm (D) 7 in a plane perpendicular to the plane corresponding to the excitation vibration, as indicated by the arrow 17.

This mechanical vibration is transformed by the piezoelectric quartz of tuning fork 1 into an electric signal which is detected by the detection electrodes 7 of tuning fork 1.

In the present invention the problem of positioning the excitation electrodes 9 and the detection electrodes 11 on the arms of tuning fork 1 so as to generate an optimum electric response of the tuning fork will not be discussed here, this problem having been discussed and solved in the document cited belonging to the state of the art. On the contrary, the present invention is concerned with a method of electronically processing the electric excitation and detection signals, and concerns the means which are associated with this, so as to isolate and measure the useful component of the detection signal, i.e. the component which is due to the Coriolis force, and this with a resolution and a speed which are sufficient so as to allow the use of the tuning fork in new applications.

To this effect, reference will be made to FIG. 2, in which is represented in a schematical way a tuning fork 1 corresponding to that one of FIG. 1, associated to an electronic processing circuit of the excitation and of the detection signal.

In a manner which is known as such, the excitation electrodes 9 of tuning fork 1 are integrated into a resonance circuit which is schematised by the loop 10 and which is supplied with a continuous current by an amplifier 21, and where the detection signal DET is detected at the terminals of the detection electrodes 11.

As a simplification of the considerations which will follow, it will be assumed that the excitation signal (OSC) is sinusoidal, and that the detection signal (DET) corresponds to the superposition of a parasite component and of a useful component corresponding to the Coriolis force, phase-shifted about an angle $\phi_0$ with respect to the excitation signal. Under these conditions, the signals OSC and DET satisfy the following equations:

$$OSC = A \cdot \sin(\omega_0 t + \phi_0), \quad (1)$$

in which A is the amplitude of the excitation signal, $\omega_0$ is its pulsation and $\phi_0$ is its initial phase-shift with respect to the detection signal, and:

$$DET = B \cdot \sin(\omega_0 t) + C \cdot \cos(\omega_0 t), \quad (2)$$

in which the first term represents a parasite signal caused by the capacitive mechanical coupling between the arms of the tuning fork and the second term represents the useful signal which is caused by the Coriolis force, its amplitude C being the amplitude to be measured, and which is proportional to the rotational speed $\Omega$ of the tuning fork.

It should further be noted that the phase-shift $\phi_0$ between the excitation signal OSC and the detection signal DET is constant for a given tuning fork, and is typically around 56° for a tuning fork such as the one represented in FIG. 1.

The detection signal DET appears as a phase modulated signal, which can be defined according to the following equation:

$$DET = \sqrt{(B^2 + C^2)} \cdot \sin(\phi(t)), \quad (3)$$

In practice, it has been noted that the amplitude C of the useful component of the detection signal is much smaller, for rotational speeds $\Omega$ which are around 50°/s, than the amplitude B of the parasite coupling component, so that the ratio C/B is typically around 1/50, which corresponds to a phase-shift angle $\psi$ which is very small, around 1°, and which is difficult to measure and to be used for determining the rotational speed $\Omega$ of tuning fork 1.

As a consequence, the principle of the present invention intends to provide an analog processing of the signals OSC and DET, so as to allow to extract more easily the amplitude C of the useful component of the detected signal.

Figure 2:
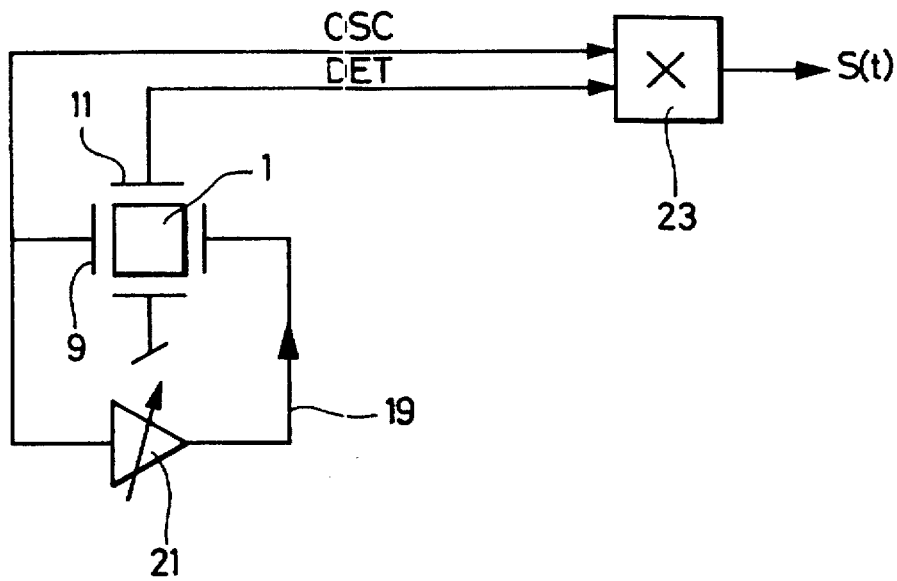
FIG. 2 is a schematic view of the angular speed measuring device according to the invention.

According to a first embodiment of the invention, as shown schematically in FIG. 2 by block 23, this analog processing consists in bringing the signals OSC and DET to an analog multiplier. The resulting signal S (t) corresponds to the following relationship (4):

$$S(t) = OSC \cdot DET = [A \cdot \sin(\omega_0 t + \psi_0)] \cdot [B \cdot \sin(\omega_0 t) + C \cdot \cos(\omega_0 t)] \quad (4)$$

so that:

$$S(t) = A \cdot B/2 [\cos \psi_0 - \cos(2\omega_0 t + \psi_0)] + A \cdot C/2 [\sin(2\omega_0 t + \psi_0) + \sin \psi_0].$$

According to the invention, the mixing of the signals OSC and DET is followed by an all-pass filter comprising filters having an appropriate cut-off frequency so as to eliminate the multiple values of $\omega_0$. If the pulsation $\omega_0$ is chosen in such a way to correspond to a frequency of 8 kHz for example, it will suffice to filter the components of S (t) at 16 kHz. What remains is a signal S' (t) according to relationship (4) here above:

$$S'(t) = A \cdot B/2 \cdot \cos \psi_0 + A \cdot C/2 \cdot \sin \psi_0. \quad (5)$$

Preferably, the signals OSC and DET are phase-shifted before their mixing, with the aid of all-pass filter phase-shifters allowing to fix their phase-shift at $\pi/2$. When OSC and DET are thus in quadrature, their mixing and filtering results in a signal S"(t) which satisfies the relationship (6): $S''(t) = A \cdot C/2$, the amplitude of which is proportional to the amplitude C of the useful component, and which is representative of the angular speed $\Omega$ (t) which is the one to be measured.

As a result, the speed may be determined thanks to the analog processing described here above, solely by way of the amplitude A of the excitation signal OSC and the amplitude C of the useful component of the detection signal DET, but independently of the parasite component of the detection signal.

Figure 3:
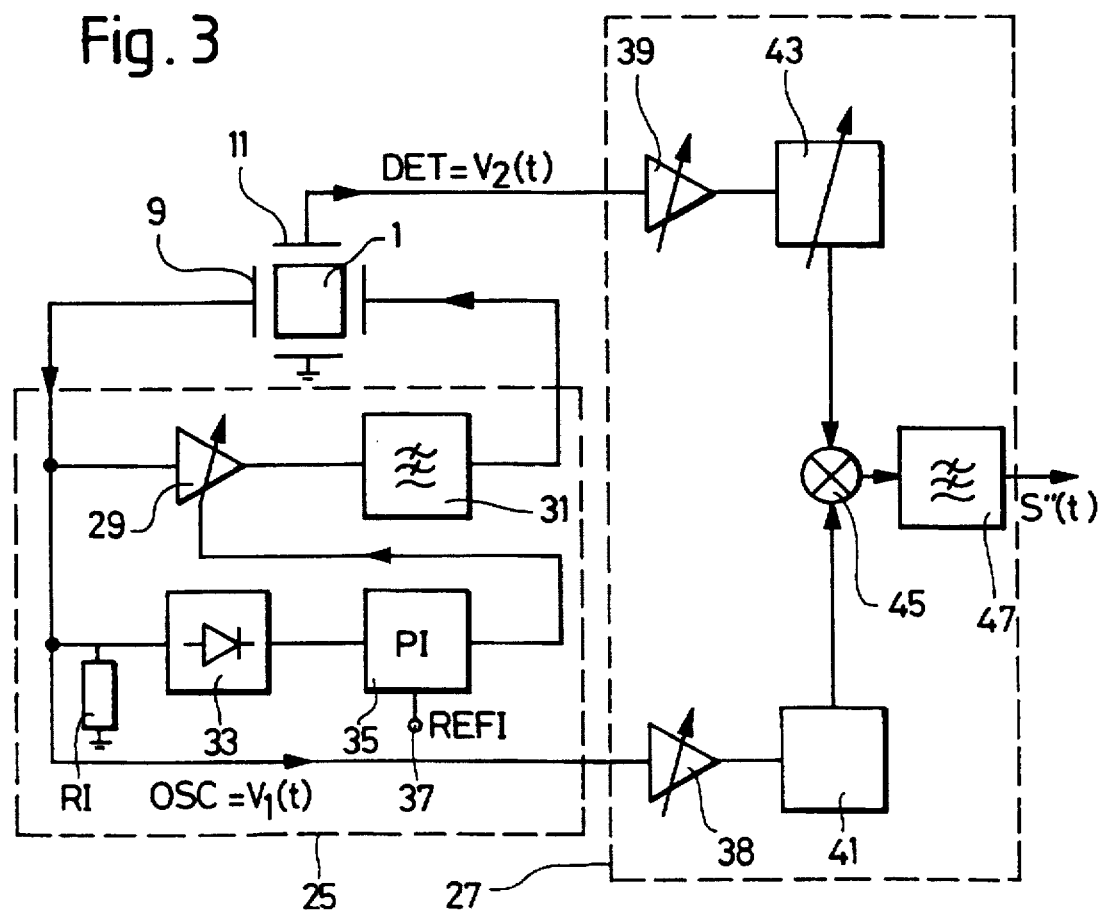
FIG. 3 is a more detailed view of a first embodiment of an angular speed measuring device according to the invention.

Reference will be made to FIG. 3 in which is shown a schematical representation of an example of an embodiment of an electronic device capable of generating the analog signal S" (t), such as defined here above, from a signal OSC=$V_1$(t) et DET=$V_2$(t).

The electronic device of FIG. 3 comprises in principal an oscillator stage 25 which supplies tuning fork 1 with an excitation signal OSC, and an analog processing stage 27, which uses the detection signal DET and the excitation signal OSC for producing an output signal S" (t) allowing to measure the angular speed of the tuning fork.

Oscillator stage 25 comprises, in a known manner, an amplifier 29 the output of which is connected to the input of an all-pass filter 31. A feedback loop comprising a rectifier 33 in series with a current integrator regulator 35 using a reference current source 37 (REFI) measures the amplitude of excitation signal OSC and acts on the amplitude $A_0$ of the amplifier 29 for maintaining constant this amplitude and for regulating it to a given value, thus allowing to stabilise the level of the excitation signal OSC provided by the oscillator stage. A resistance R1 connected between the input of rectifier 33 and the mass, allows to obtain an indication of the current which flows through tuning fork 1.

The analog processing stage 27 comprises amplifiers 38, 39 respectively of the excitation signal OSC and of the detection signal DET. The outputs of these amplifiers are connected respectively to phase-shifting means 41 and 43 in particular realised by way of all-pass filters, allowing to put into quadrature the amplified signals OSC and DET. The outputs of phase-shifters 41, 43 are connected to the input of an analog mixer 45, which provides at its output a mixed signal corresponding to the equation (4) here above. This signal is transmitted to a low-pass filter 47 which eliminates the frequencies which are a multiple of the frequency of the excitation signal, and which provides a signal S" (t) corresponding to equation (6) here above.

Preferably, for increasing the resolution $\Delta\Omega$ (°/S) of the device, the invention allows the use of a double mixing technique of the excitation signal OSC and the detection signal DET with a third reference signal REF having a greater amplitude.

Figure 4:
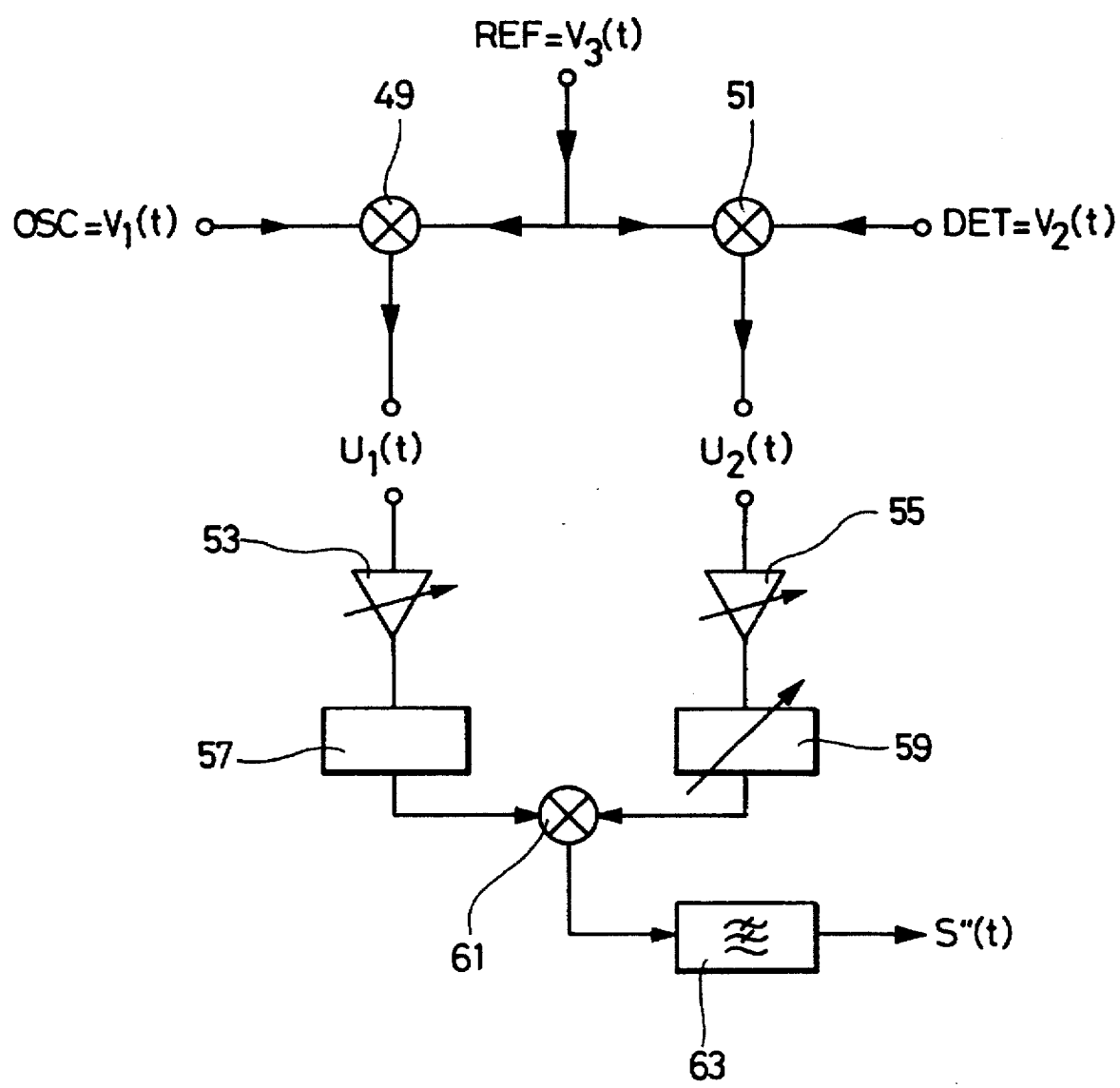
FIG. 4 is a schematical view of another embodiment of the angular speed measuring device according to the invention.

This preferred embodiment of the invention is shown schematically in FIG. 4, in which only the processing stage of the signal OSC and DET has been represented. The signal OSC=$V_1$(t) is mixed with the signal REF=$V_3$(t) in a mixer 49, the resulting signal being indicated by $U_1$(t). Further, the signal DET=$V_2$(t) is also mixed in a mixer 51 with a reference signal, in particular with the same signal REF= $V_3$(t), the resulting signal being indicated by $U_2$(t). The signals $U_1$(t) and $U_2$(t) are then processed by amplifier means 53, 55 and are phase-shifted by phase-shifting means realised by a way of all-pass filters 57, 59, in a way similar to that described in relation to FIG. 3, by corresponding analog processing circuits. The signals coming from all-pass filters 57, 59 are then transmitted to a new multiplier 61, the output of which is transmitted to a low-pass filter 63 providing a measurement signal S" (t) of the angular speed of tuning fork 1.

By choosing a reference signal $V_3$(t) according to the following relationship (7):

$$V_3(t)=R\cdot\cos\,[(\omega+\Delta\omega)t], \qquad (7)$$

and by conserving for the signal OSC and DET the preceding relationships, the following is obtained:

$$U_1(t)=A\cdot R/2\cdot\cos\,(\Delta\omega t-\phi) \qquad (8)$$

and $$U_2(t)=B\cdot R/2\,\cdot\cos\,\Delta\omega t+C\cdot R/2\cdot\sin\,\Delta\omega t \qquad (9)$$

Then, after filtering and phase-shifting as explained here above, and after mixing in the mixer 61, S" (t) is obtained which corresponds to the relationship (10):

$$S''(t)=A'\cdot C'/2, \qquad (10)$$

in which A'=A·R/2 and C'=C·R/2, so that:

$$S''(t)=(A\cdot C/2)\cdot(R^2/4) \qquad (11)$$

It results from this that the measurement signal S" (t) of the angular rotational speed of tuning fork 1 is, due to the technique of the double mixer as describes here above, always proportional to the amplitude C of the useful component of the detection signal, but which is further multiplied by a term ($R^2/4$) with respect to the embodiment without the double mixing. Thus, it suffices to choose a reference signal having an amplitude R which is superior to 2 Volts so as to increase the amplitude of the measurement signal S" (t). As a consequence, by choosing a reference signal REF having a sufficiently large amplitude, it is possible to increase as desired the resolution of the measurement of the angular speed.

Furthermore, the device according to the invention may advantageously be used in combination with a digital circuit of an angular speed measuring device such as described in the European patent EP-B-0 515 981 cited here above. As such, when the signals $V_1$(t) and $V_2$(t) have been mixed with the reference signal $V_3$(t) so as to obtain the signal S" (t) corresponding to the relationship (10), instead of passing through an analog processing of the signal such as described here above, the output signal is passed through a counter so as to digitalise this signal. As has been explained in the patent cited here above, the device uses a reference clock signal for sampling the measurement signal of the angular speed. The resolution of the device is determined by the relationship between the frequency of the measurement signal of the angular speed and the frequency of the clock signal. The lower the frequency of the measurement signal with respect to the frequency of the clock signal, the higher the resolution.

However, the frequency of the clock signal is fixed, for example at 20 MHz, and may not be easily changed without implying an increased consumption by the digital circuit. Thus, it is preferable to be able to lower the frequency of the measurement signal of the angular speed. Now then, the device according to the invention can do this by way of reference signal REF. In fact, as the signal S" (t) has a frequency which is proportional to ($\omega\Delta\omega$), $\Delta\omega$ may be chosen close to $\omega$ in such a way that the frequency of the measurement signal will be lower. For example, if the frequency of the oscillation signal OSC is around 8 KHz, the frequency of the reference signal REF will be chosen around 7 Khz so as to obtain a frequency of the signal S" (t) which will be around 1 kHz. Thus, the resolution will be increased by a factor 8 with respect to the resolution which may be obtained by the device described in the patent EP-B-0 515 981 cited here before.

From this is follows that the angular speed measuring device according to the invention reaches its aims by allowing, on the one hand, to provide an output signal which only depends on the useful component of the detection signal, and which allows, on the other hand, either to increase the amplitude of the output signal or to lower the frequency of the output signal so as to increase the resolution of the angular speed measurement.

What is claimed is:

1. An angular speed measuring device comprising:
    a transducer rotatable at said angular speed;
    means for generating a mechanical vibration of said transducer in response to an excitation signal, this mechanical vibration comprising a parasite component and at least one useful component having an amplitude which is representative of said angular speed;

means for producing an electric detection signal representative of said mechanical vibration and also comprising a parasite component and at least one useful component having an amplitude which is representative of said angular speed;

wherein the device further comprises processing means for obtaining from said electric detection signal, an analog measurement signal whose amplitude only depends on said useful component of the electric detection signal, the parasite component of the electric detection signal being eliminated, said processing means comprising means for mixing the detection signal with the excitation signal and comprising phase-shifting means connected to the input of said means for mixing for rendering the analog measurement signal independent of an initial phase-shift between the excitation signal and the detection signal in such a way that the amplitude of the resulting measurement signal presents a value which is proportional to said angular speed.

2. A device according to claim 1, wherein said transducer is a quartz tuning fork.

3. A device according to claim 1, wherein said processing means of the signals comprises a low-pass filter connected to the output of said means for mixing and having a cut-off frequency which is chosen in such a way so as to eliminate the components of the analog measurement signal which have a frequency higher than the frequency of the excitation signal.

4. A device according to claim 1, said device further comprising amplifying means of the excitation signal, of the detection signal, and/or of the measurement signal.

5. A device according to claim 1, wherein said processing means comprise mixing means for respectively mixing the excitation signal and the detection signal with a reference signal, said mixing means being connected to at least one of a low-pass filter means and a phase-shifting means, in such a way so as to produce an output signal having an amplitude which is a function of the angular speed of the transducer and of the amplitude of the reference signal.

6. A device according to claim 5, wherein said reference signal has a sufficiently high amplitude (R) to increase the resolution of the measurement signal of the angular speed.

7. A method of measuring the angular speed of a transducer which undergoes a Coriolis force due to its angular movement, said method comprising the following steps:

applying an electric excitation signal to the transducer for generating in response a detection signal comprising a useful component representative of the angular speed of the transducer and comprising a parasite component;

detecting said detection signal;

said method further comprising the following steps:
mixing the excitation signal with the detection signal, and
processing the excitation signal, the detection signal and the mixed signal so as to produce an output signal whose amplitude is representative of said useful component but independent of said parasite component.

8. A method according to claim 7, further comprising the following steps:

phase-shifting the excitation signal and the detection signal by a value which corresponds to the initial phase-shift between the excitation signal and the detection signal;

filtering and eliminating those components of the phase-shifted signals and of the mixed output signal which have a frequency higher than the frequency of the excitation signal, so as to obtain an output signal (S") whose amplitude is a function of the angular speed.

9. A method of measuring the angular speed of a transducer undergoing a Coriolis force due to its angular movement, comprising the following steps:

applying an electric excitation signal to the transducer generating in response a detection signal comprising a useful component which is representative of the angular speed of the transducer and comprising a parasite component;

detecting said detection signal;

said method further comprising the following steps:
respectively mixing the excitation signal and the detection signal with a reference signal;
phase-shifting the mixed signals by a value which corresponds to the initial phase-shift between the excitation signal and the detection signal;
filtering the mixed and phase-shifted signals so as to eliminate the components of these signals which have a frequency higher than the frequency of the excitation signal, and
mixing the obtained filtered signals so as to obtain an output signal, and filtering said output signal so as to obtain a measurement signal whose amplitude is a function of the angular speed and is independent of said parasite component.

10. A method of measuring the angular speed of a transducer which undergoes a Coriolis force due to its angular movement, said method comprising the following steps:

applying an electric excitation signal to the transducer to generate a detection signal comprising a useful component representative of the angular speed of the transducer and further comprising a parasite component;

detecting said detection signal;

said method further comprising the following steps:
mixing the excitation signal with the detection signal, and
processing the excitation signal, the detection signal or the mixed signal so as to produce an output signal having an amplitude representative of said useful component but independent of said parasite component.

11. A method according to claim 10, further comprising the following steps:

phase-shifting the excitation signal and the detection signal by a value which corresponds to the initial phase-shift between the excitation signal and the detection signal;

filtering and eliminating those components of the phase-shifted signals and of the mixed output signal which have a frequency higher than the frequency of the excitation signal, so as to obtain an output signal (S") whose amplitude is a function of the angular speed.

* * * * *